United States Patent
Ozeki et al.

(10) Patent No.: US 7,128,991 B2
(45) Date of Patent: Oct. 31, 2006

(54) FUEL CELL ELECTRICITY GENERATOR

(75) Inventors: Masataka Ozeki, Izumi (JP);
Tomonori Asou, Kitakatsuragi-gun (JP);
Akira Maenishi, Ikeda (JP); Shinji Miyauchi, Shiki-gun (JP); Akinari Nakamura, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 479 days.

(21) Appl. No.: 10/362,020

(22) PCT Filed: Aug. 10, 2001

(86) PCT No.: PCT/JP01/06956

§ 371 (c)(1),
(2), (4) Date: Feb. 19, 2003

(87) PCT Pub. No.: WO02/17425

PCT Pub. Date: Feb. 28, 2002

(65) Prior Publication Data

US 2004/0023088 A1 Feb. 5, 2004

(30) Foreign Application Priority Data

Aug. 18, 2000 (JP) .............................. 2000-248930
Oct. 19, 2000 (JP) .............................. 2000-319010

(51) Int. Cl.
*H01M 8/06* (2006.01)
*H01M 8/04* (2006.01)
(52) U.S. Cl. .............................. 429/20; 429/22; 429/24
(58) Field of Classification Search .................... None
See application file for complete search history.

(56) References Cited

FOREIGN PATENT DOCUMENTS

| JP | 58-99614 | 6/1983 |
|----|----------|--------|
| JP | 63-99418 | 4/1988 |
| JP | 4-59602 | 2/1992 |
| JP | 8-203548 | 8/1996 |

*Primary Examiner*—Jonathan Crepeau
(74) *Attorney, Agent, or Firm*—McDermott Will & Emery

(57) ABSTRACT

To provide a fuel cell power generator capable of reliably recognizing ignition and misfire of a burner for heating a fuel gas generator and operating safely, a fuel cell power generator comprising, a fuel gas generator for generating a fuel gas composed mainly of hydrogen from a raw material for power generation and water, a water feeder for feeding water to the fuel gas generator, and a fuel cell for performing power generation using the fuel gas and oxidant gas is provided with: a burner for heating the fuel gas generator by combusting at least one combustion fuel selected from the group consisting of the raw material for power generation, the fuel gas, and an off-gas discharged from a fuel cell; and a flame detector for detecting the state of a flame formed in the burner.

3 Claims, 4 Drawing Sheets

FUEL CELL ELECTRICITY GENERATOR

TECHNICAL FIELD

The present invention relates to a fuel cell power generator which uses: raw material for power generation supplied to a fuel gas generator; off-gas discharged from a fuel electrode of a fuel cell; or generated gas (fuel gas) generated in a hydrogen generator; as combustion fuel for heating said fuel gas generator.

BACKGROUND ART

A prior art power generator using a fuel cell is described below with reference to FIGS. 3 and 4. FIG. 3 is a diagram showing the configuration of a prior art fuel cell power generator. FIG. 4 is a diagram showing the configuration of a control circuit of the prior art fuel cell power generator. In a fuel cell 1 shown in FIG. 3, an air electrode 2 and a fuel electrode 3 are arranged such as to sandwich a polymer electrolyte membrane 4, and the upstream side of the air electrode 2 is connected to a blower 5 for supplying air. A hydrogen generator (fuel gas generator) 6 is supplied with a power generation fuel X serving as a raw material such as natural gas or methanol and water Y necessary for a steam reforming reaction, and the obtained fuel gas G is supplied through a switching valve 7 to the fuel electrode 3, and thereby flows downstream through a predetermined passage contacting with the fuel electrode 3. At that time, a required amount of hydrogen in the fuel gas G is consumed in an electrode reaction, whereby the residual hydrogen and the like are supplied as off-gas OG to a burner 8. When the fuel gas G is not supplied to the fuel electrode 3, the fuel gas G is supplied through the switching valve 7 to the burner 8.

In general, when the fuel cell power generator is in the off state, the passages for the fuel gas G and the off-gas OG in the fuel gas generator 6, the fuel electrode 3, and the like are filled with an inert gas such as nitrogen. Further, even when the fuel cell power generator is started up, until the temperature of the fuel gas generator 6 becomes stable, the concentration of carbon monoxide in the fuel gas G is high. The carbon monoxide degrades an electrode catalyst in the polymer electrolyte membrane 4 of the fuel cell 1 and, accordingly, the fuel gas G having a high carbon monoxide concentration is not allowed to go to the fuel cell 1 and is supplied through the switching valve 7 to the burner 8 for a few tens minutes to a few hours after the start up. When the time of a few tens minutes to a few hours has been elapsed after the start up and the temperature of the fuel gas generator 6 has become stable, the fuel gas G is supplied through the switching valve 7 to the fuel electrode 3 for starting power generation of the fuel cell 1.

The fuel gas G supplied to the burner 8 or the off-gas OG combusts with air supplied from a fan 9 to form a flame 11 in a combustion chamber 10, whereby the combusted gas heats the fuel gas generator 6. The flame 11 in the combustion chamber 10 is detected on the basis of the ion current, which is generated when a predetermined voltage is applied on the flame.

As shown in FIG. 4, a flame detector 12 is comprised of: a DC power supply 14 for applying a predetermined voltage on the electric conductor 13 and the burner 8 while using the flame 11 as a flame resister; a resistor (RA) 15 for converting a current (IRA) equivalent to the ion current (IF) flowing through the flame 11, into a voltage; a voltage detection section 16 for detecting the voltage across the resistor (RA) 15; and a control section (not shown) for controlling them, in order to measure the ion current which flows to the burner 8 via a heat resistive electric conductor 13 provided such as to contact with the flame 11.

As shown in FIG. 4, the control section (control circuit) of the flame detector 12 forms a current mirror circuit is formed by: transistors (Q1) 17 and (Q2) 18 each having the same characteristics; and resistors (R1) 19 and (R2) 20 each having the same resistance, in order to let a current (IRA) equivalent to the ion current (IF) flowing through the flame resistor (RF) flow through the flame resistor (RA) 15. Accordingly, currents (IR1) and (IR2) flowing respectively through the resistors (R1) 19 and (R2) 20 are equal to each other and a current equal to the currents (IR1) and (IR2) flows as the current (IRA) equivalent to the ion current (IF) flowing through the flame 11 to generate a voltage across the resistor (RA) 15. As such, the flame detection section 12 detects the combustion state such as ignition and misfire of the flame 11.

In such a prior art fuel cell power generator, the concentrations of hydrocarbon in the fuel gas G and the off-gas OG are extremely low because the hydrocarbon in the raw material for power generation X is converted into hydrogen by the steam reforming reaction. When the concentration of hydrocarbon is low, the ion concentration also becomes low in the flame 11, the current value flowing through the flame 11 is reduced and, hence, the voltage across the resistor (RA) 15 is reduced. That is, there has been the problem that the detection voltage in the flame detection section 12 becomes low to cause a difficulty in state recognition at the times of ignition and misfire. For example, when misfire is erroneously determined as ignition and the fuel gas is supplied continuously, under the condition that the combustion section is at a high temperature (400° C. or higher), there is a danger of explosive ignition when the concentration reaches the limit of explosion or higher. In contrast, when ignition is erroneously determined as misfire, such an unnecessary determination of misfire may cause a defect such as stoppage of the equipment operation.

Thus, in order to resolve the above-mentioned problems in the prior art, an object of the invention is to provide a fuel cell power generator capable of reliably recognizing ignition and misfire of a burner for heating a fuel gas generator and operating safely.

DISCLOSURE OF INVENTION

The present invention relates to a fuel cell power generator comprising, a fuel gas generator for generating fuel gas composed mainly of hydrogen from a raw material for power generation and water, a water feeder for supplying water to the fuel gas generator, and a fuel cell for performing power generation using the fuel gas and an oxidant gas, further comprising:

a burner for heating the fuel gas generator by combusting at least one combustion fuel (referred to as "off-gas or the like" in some cases hereafter) selected from the group consisting of the raw material for power generation, the fuel gas, and an off-gas discharged from the fuel cell; and a flame detector for detecting the state of a flame formed in the burner.

It is effective that said flame detector detects the state of the flame by detecting a flame detection current, which is in proportion to an ion current of the flame.

Further, it is effective that the fuel cell power generator comprises a first control section for switching a gain for the flame detection current into a predetermined value depending on the amount of hydrocarbon contained in the combustion fuel. The first control section can be incorporated in the flame detector.

It is also effective that the fuel cell power generator comprises a temperature detector for detecting the temperature of the fuel gas generator, and that the first control section switches a gain for the flame detection current into a predetermined value depending on the detected temperature by the temperature detector.

It is also effective that the fuel cell power generator comprises a blower for supplying air to the burner, and that the first control section switches a gain for the flame detection current of the flame detector into a predetermined value depending on the amount of air supplied from the blower to the burner.

It is also effective that the first control section switches a gain for the flame detection current of the flame detector into a predetermined value depending on the amount of water supplied from the water feeder to the hydrogen generator.

It is also effective that the fuel cell power generator comprises a hydrocarbon sensor for detecting the concentration of hydrocarbon in the fuel gas, and that the first control section switches a gain for the flame detection current of the flame detector into a predetermined value depending on the output value of the hydrocarbon sensor.

It is also effective that the first control section switches a gain for the flame detection current of the flame detector into a predetermined value depending on the supply amount of the raw material for power generation provided to the fuel gas generator.

It is also effective that the fuel cell power generator comprises a second control section for supplying the fuel gas to the fuel cell and performing ignition operation of the burner when power generation is started in the fuel cell.

It is also effective that the second control section prevents the flame detector from detecting the flame during the ignition operation of the burner.

It is also effective that the second control section prevents the flame detector from detecting the flame for a predetermined time duration after the fuel gas is supplied.

It is also effective that the second control section prevents the flame detector from detecting the flame until the flame detection current reaches a predetermined value or higher after the fuel gas is supplied.

BEST MODE FOR CARRYING OUT THE INVENTION

In a fuel cell power generator in accordance with the present invention, the flame detection is performed with switching the gain for the flame detection current into a predetermined value depending on the amount of hydrocarbon contained in the off-gas or the like, whereby the difference between the ignition level and the misfire (fire extinction) level is ensured to be large and noise margin is also ensured to be large and, therefore, misidentification and misdetermination can be avoided to permit reliable determination of ignition and misfire and, further, dangers of explosive ignition and gas leakage caused by misdetermination of misfire and unnecessary stoppage of the equipment operation caused by misdetermination of ignition can also be avoided.

Embodiments of the present invention are described below in detail with reference to FIGS. 1 and 2 but the present invention is not limited thereto.

Figure 1:
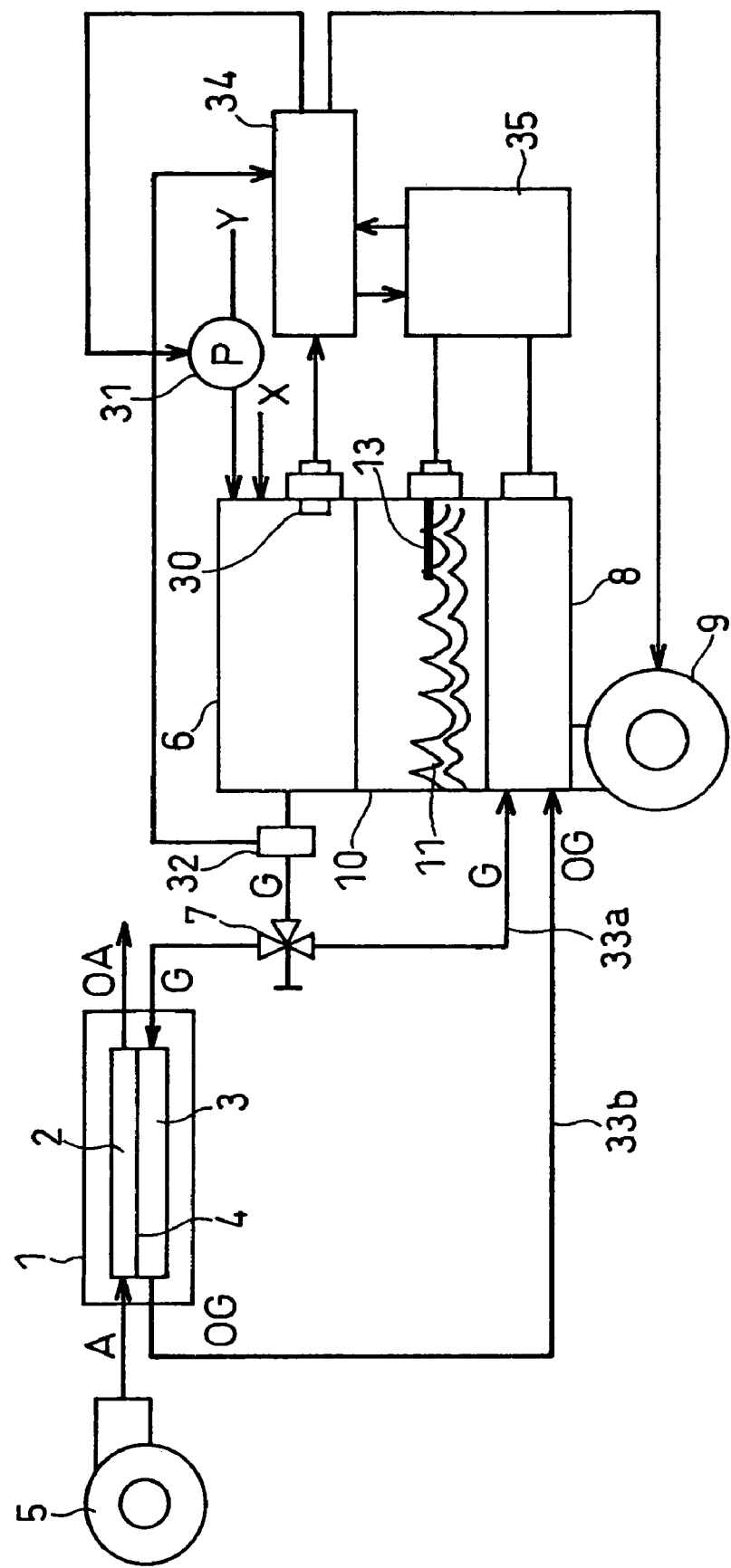
FIG. 1 is a diagram showing the configuration of a fuel cell power generator in accordance with the present invention.

FIG. 1 is a configuration diagram of a fuel cell power generator in accordance with Embodiment 1 of the present invention. FIG. 2 is a configuration diagram of a control circuit of a flame detector of a fuel cell power generator in accordance with Embodiment 1 of the present invention.

Figure 2:
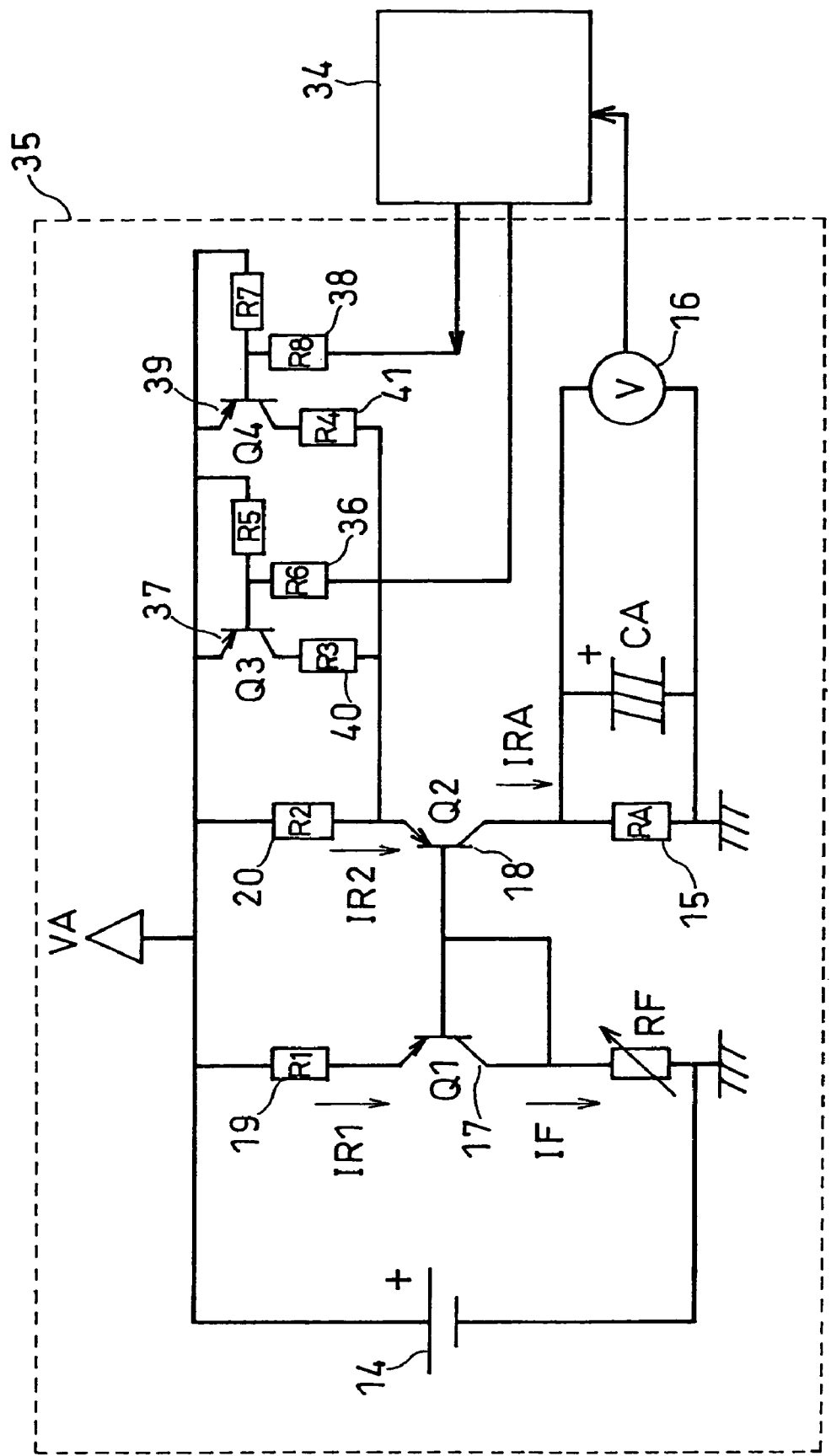
FIG. 2 is a diagram showing the configuration of a control circuit of a fuel cell power generator in accordance with the present invention.
Figure 3:
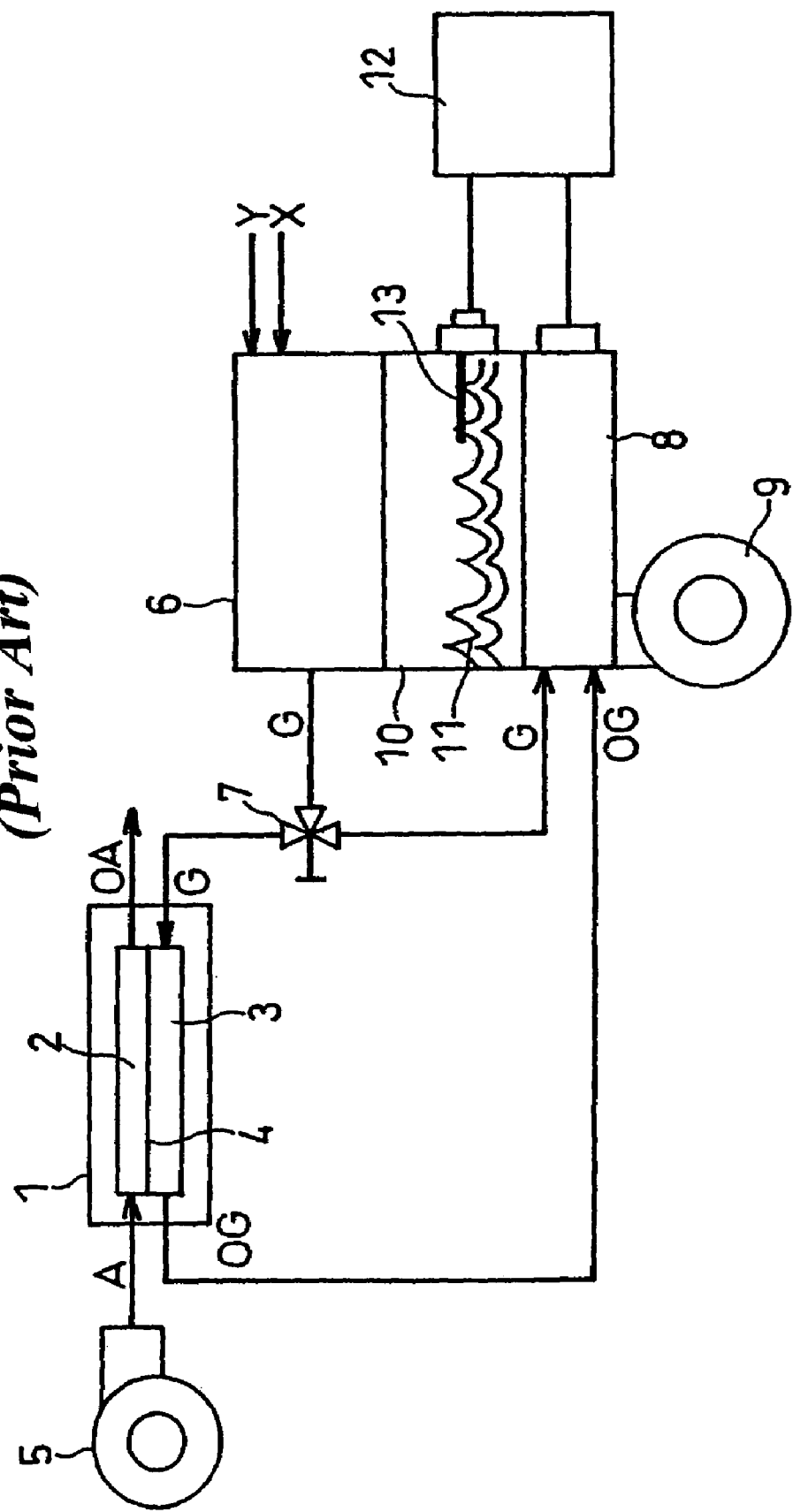
FIG. 3 is a diagram showing the configuration of a prior art fuel cell power generator.
Figure 4:
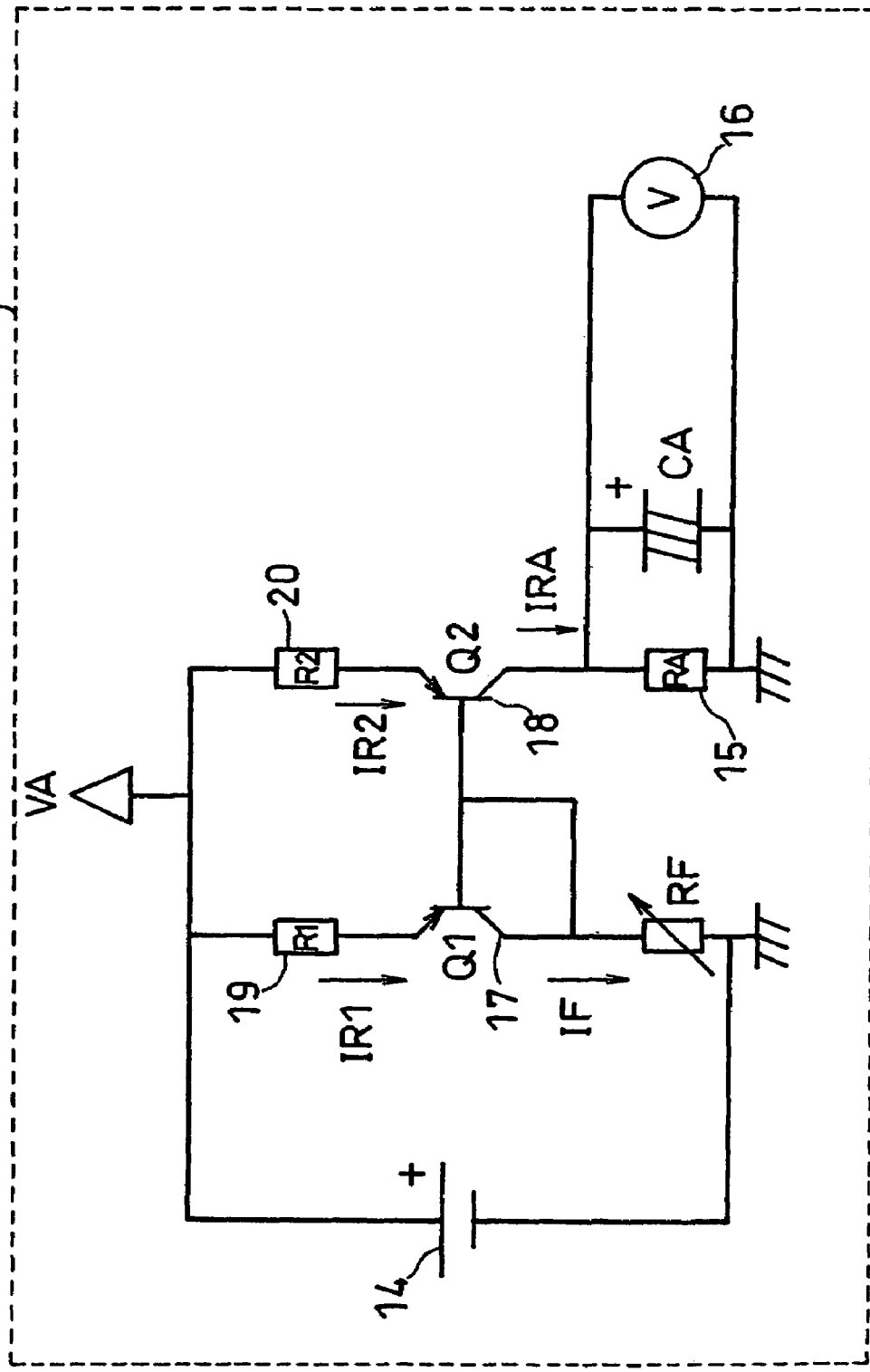
FIG. 4 is a diagram showing the configuration of a control circuit of a prior art fuel cell power generator.

In FIGS. 1 and 2, components having the same functions as those in the prior art power generator using a fuel cell shown in FIGS. 3 and 4 are designated by the same reference numerals, and the detail of the functions thereof is as described above and hence the description is omitted.

In FIG. 1, a temperature detector 30 detects the temperature of a fuel gas generator 6 and, a pump 31 serves as a water feeder for supplying raw material water Y. A hydrocarbon sensor 32 detects the concentration of hydrocarbon in a fuel gas G. For the hydrocarbon sensor 32, a hydrocarbon sensor of gas chromatography type, infrared absorption type, or photoacoustic type, and the like can be used.

An off-gas OG discharged from a fuel electrode 3 and the fuel gas G generated in the fuel gas generator 6 are supplied through gas supply passages 33a and 33b, respectively, to a burner 8. The burner 8 is provided with a fan 9 serving as a blower. A first control section 34 operates and controls the pump 31 and the fan 9 depending on the detected value by the temperature detector 30 or the hydrocarbon sensor 32.

A control circuit of a flame detector 35 is connected such that, depending on the detected temperature by the temperature detector 30, the control circuit converts an ion current of a flame in the flame detector 35 into a flame detection current, which is in proportion to the ion current, to detect this flame detection current as a flame detection voltage. And, a detection signal of this voltage is inputted from the flame detector 35 to the first control section 34, and a signal for switching the gain for the flame detection current into a predetermined value is outputted from the first control section 34 to the flame detector 35.

As shown in FIG. 2, the control circuit of the flame detector 35 outputs a signal through a resistor (R6) 36 to a transistor (Q3) 37 and thereby turns it ON or OFF, and outputs a signal through a resistor (R8) 38 to a transistor (Q4) 39 and thereby turns it ON or OFF. When the transistor (Q3) 37 is ON, the voltage drop caused by the current flowing through a parallel combined resistance (RX1) expressed by the equation (1):

$$RX1 = R2 \cdot R3/(R2+R3)$$

composed of a resistance (R2) 20 and a resistance (R3) 40 is equal to the voltage drop caused by the current (IR1) flowing through a resistance (R1) 19. Further, when the transistor (Q4) 39 is ON, the voltage drop caused by the current flowing through a parallel combined resistance (RX2) expressed by the equation (2):

$$RX2 = R2 \cdot R4/(R2+R4)$$

composed of the resistance (R2) 20 and a resistance (R4) 41 is equal to the voltage drop caused by the current (IR1) flowing through the resistance (R1) 19.

The operation and the effect of the fuel cell power generator in accordance with the present invention are described below. When the fuel gas generator 6 is supplied with the raw material for power generation X and water Y, hydrocarbon contained in the raw material for power generation X is reformed by a steam reforming reaction to obtain a hydrogen-rich fuel gas G. This fuel gas G is supplied as off-gas or the like through the gas supply passage 33a or 33b to the burner 8. The off-gas or the like is combusted with air supplied from the fan 9 to form a flame 11 in a combustion chamber 10. The combusted gas by the flame 11 heats the fuel gas generator 6 itself to increase the temperature thereof, and thereby maintains the steam reforming reaction.

The flame detection of the flame 11 is performed in such a manner that, the first control section 34 converts the ion current flowing by ions in the flame 11 into a flame detection current, which is in proportion to the ion current to detect this current as a flame detection voltage by the voltage detector 16, and a detection signal of this voltage is inputted to the first control section 34 and a signal for switching the gain for the flame detection current into a predetermined value is outputted from the first control section 34 to the flame detection section 35.

When the temperature of the fuel gas generator 6 detected by the temperature detector 30 reaches a predetermined temperature or higher, the first control section 34 outputs a signal through the resistor (R6) 36 to the transistor (Q3) 37 to turn it ON. At that time, the parallel combined resistance (RX1) is connected such that the voltage drop caused by the current (IR1) flowing through the resistor (R1) 19 is equal to the voltage drop caused by the current flowing through the parallel combined resistance (RX1) and, accordingly, the collector current (IR2) of the transistor (Q2) 18 during the ON state of the transistor (Q3) 37 is amplified into R2/RX1 times the collector current (IR2) of the transistor (Q2) 18 during the OFF state of the transistor (Q3) 37. This amplified collector current (IR2a) flows through the resistor (RA) 15, while this current is detected by detecting the voltage across the resistor (RA) 15 with the voltage detector 16.

When the temperature of the fuel gas generator 6 detected by the temperature detector 30 further exceeds a predetermined temperature, the first control section 34 outputs a signal through the resistor (R8) 38 to the transistor (Q4) 39 and thereby turns it ON. The parallel combined resistance (RX2) is connected such that the voltage drop caused by the current (IR1) flowing through the resistor (R1) 19 is equal to the voltage drop caused by the current flowing through the parallel combined resistance (RX2) and, accordingly, the collector current (IR2) of the transistor (Q2) 18 during the ON state of the transistor (Q4) 39 is amplified into R2/RX2 times the collector current (IR2) of the transistor (Q2) 18 during the OFF state of the transistor (Q4) 39. This amplified collector current (IR2b) flows through the resistor (RA) 15, while this current is detected by detecting the voltage across the resistor (RA) 15 with the voltage detector 16. In FIG. 2, the collector current of the transistor (Q2) is denoted by IRA.

When the burner 8 starts the heating of the fuel gas generator 6 and the temperature of the fuel gas generator 6 rises, the amount of hydrocarbon contained in the supplied off-gas or the like decreases and the ion current of the flame 11 decreases. The amount of hydrocarbon contained in the off-gas or the like is the amount of residual hydrocarbon having not been converted into hydrogen in the fuel gas generator 6 and, accordingly, when the conversion rate reaches a predetermined value or higher with increasing temperature of the fuel gas generator 6, the amount of hydrocarbon decreases and the ion current of the flame 11 also decreases. Thus, by switching the gain for the flame detection current into a predetermined value to increase the gain by turning the transistor Q3 (37) or Q4 (39) ON with the first control section 34, the difference between the ignition level and the misfire (fire extinction) level is ensured to be sufficiently large by the voltage detector 16 for detecting the voltage across the resistor (RA) 15. As a result, noise margin is also ensured to be appropriately large and misidentification and misdetermination can be avoided to achieve reliable determination of ignition and misfire.

When the temperature of the fuel gas generator 6 exceeds a predetermined temperature, the first control section 34 operates and controls the fan 9 such as to increase the amount of air blow from the fan 9. Similarly, when the temperature of the fuel gas generator 6 falls below a predetermined temperature, the first control section 34 operates and controls the fan 9 such as to reduce the amount of air blow from the fan 9.

When the amount of air blow from the fan 9 is reduced, air is supplied in an amount below that necessary for the combustion of the off-gas or the like, and this causes a tendency of insufficiency of air and an insufficiency in air cooling of the fuel gas generator 6. As a result, the temperature of the fuel gas generator 6 rises, the amount of hydrocarbon contained in the off-gas or the like supplied for the combustion decreases, and the ion current of the flame 11 decreases.

On the contrary, when the amount of air blow from the fan 9 is increased, air is supplied in an amount exceeding that necessary for the combustion of the off-gas or the like, and this causes a tendency of excess of air and an excess in air cooling of the fuel gas generator 6 and, as a result, the temperature of the fuel gas generator 6 falls, whereby the amount of hydrocarbon contained in the off-gas or the like supplied for the combustion increases. Therefore, the ion current of the flame 11 increases. As such, the amount of hydrocarbon contained in the off-gas or the like can be increased or reduced depending on the amount of air blow from the fan 9, whereby the ion current of the flame 11 increases or decreases accordingly.

By switching the gain for the flame detection current into a predetermined value to increase the gain by turning the transistor Q3 (37) or Q4 (39) ON with the first control section 34, the voltage across the resistor (RA) 15 detected by the voltage detection section 16 is increased to ensure the difference between the ignition level and the misfire (fire extinction) level to be sufficiently large. As a result, noise margin is also ensured to be appropriately large and misidentification and misdetermination can be avoided to achieve reliable determination of ignition and misfire.

In accordance with this configuration, depending on the amount of air supplied from the air blowing section (fan) 9 to the burner 8, the gain for the flame detection current of the flame detection section 35 is switched into a predetermined value, whereby the flame detection can be performed reliably.

Further, when the temperature of the fuel gas generator 6 exceeds a predetermined temperature, the first control section 34 operates and controls the pump 31 such as to increase the amount of water Y supplied from the pump 31.

When the amount of supply from the pump 31 is increased, water is supplied to the fuel gas generator 6 in an amount exceeding that necessary for the steam reforming reaction and, as a result, the sensible heat and the latent heat of evaporation of the excessive water reduces the temperature of the fuel gas generator 6. This reduces the conversion rate of the raw material for power generation. As a result, the concentration of hydrocarbon contained in the off-gas or the like is increased to a predetermined value or higher, whereby the value of ion current is increased sufficiently to a measurable level.

On the contrary, when the amount of water supply from the pump 31 is reduced, water is supplied to the fuel gas generator 6 in an amount below that necessary for the steam reforming reaction and, as a result, the sensible heat and the latent heat of evaporation of the water decreases and the temperature of the fuel gas generator 6 rises to increase the conversion rate of the raw material for power generation and to decrease the amount of hydrocarbon contained in the combustion fuel. Thereby, the ion current of the flame 11 also decreases. At that time, the gain can be switched into a predetermined value to increase the gain for the flame detection current by turning the transistor Q3 (37) or Q4 (39) ON with the first control section 34, and the voltage across the resistor (RA) 15 detected by the voltage detection section 16 is increased to ensure the difference between the ignition level and the misfire (fire extinction) level to be sufficiently large. As a result, noise margin is also ensured to be appropriately large and misidentification and misdetermination can be avoided to achieve reliable determination of ignition and misfire.

In accordance with this configuration, depending on the amount of water supplied to the fuel gas generator 6, the gain for the flame detection current of the flame detection section 35 is switched into a predetermined value, whereby the flame detection can be performed.

Further, the concentration of hydrocarbon contained in the fuel gas G may be detected by the hydrocarbon sensor 32, whereby the conversion rate of the raw material for power generation may be calculated by the first control section 34. Depending on the calculated conversion rate, at least one of the fan 9 and the pump 31 is controlled by the first control section 34, while the ion current of the flame 11 is changed depending on the amount of hydrocarbon in the combustion fuel. By switching the gain into a predetermined value by turning the transistor Q3 (37) or Q4 (39) ON with the first control section 34, the gain for the flame detection current is set appropriately and the voltage across the resistor (RA) 15 detected by the voltage detection section 16 is increased to ensure the difference between the ignition level and the misfire (fire extinction) level to be sufficiently large. As a result, noise margin is also ensured to be appropriately large, and misidentification and misdetermination can be avoided to achieve reliable determination of ignition and misfire.

In accordance with this configuration, depending on the output value from the hydrocarbon sensor 32, the gain for the flame detection current of the flame detection section 35 is switched into a predetermined value, whereby the flame detection can be performed.

Further, the conversion rate of hydrocarbon may be calculated from the amount of supply of the raw material for power generation, which is provided to the fuel gas generator 6. Depending on the calculated conversion rate, at least one of the fan 9 and the pump 31 is controlled by the first control section 34, while the ion current of the flame 11 is changed depending on the amount of hydrocarbon in the raw material for power generation. The first control section 34 By switching the gain into a predetermined value by turning the transistor Q3 (37) or Q4 (39) ON with the first control section 34, the gain for the flame detection current is set appropriately and the voltage across the resistor (RA) 15 detected by the voltage detection section 16 is increased to ensure the difference between the ignition level and the misfire (fire extinction) level to be sufficiently large. As a result, noise margin is also ensured to be appropriately large, and misidentification and misdetermination can be avoided to achieve reliable determination of ignition and misfire and, further, dangers of explosive ignition and gas leakage caused by misdetermination of misfire and unnecessary stoppage of the equipment operation caused by misdetermination of ignition can be avoided.

In accordance with this configuration, depending on the amount of supply of the raw material for power generation provided to the fuel gas generator 6, the gain for the flame detection current of the flame detection section 35 is switched into a predetermined value, whereby the flame detection can be performed.

In the above-mentioned embodiments, the gain for the flame detection current has been switched into a predetermined value by turning the transistor Q3 (37) or Q4 (39) ON with the first control section 34, but it is needless to say that similar effects can be obtained even by varying the voltage (VA) of the DC power supply 14.

Further, it is effective that the fuel cell power generator in accordance with the present invention comprises a second control section for supplying the fuel gas to the fuel cell and performing ignition operation of the burner, when power generation is started in the fuel cell. The function of the second control section can be provided in the first control section.

For a few tens minutes to a few hours after the start up, when the fuel gas G is supplied through the switching valve 7 to the burner 8 but is not supplied to the fuel electrode 3 of the fuel cell 1, the fuel electrode 3 is still filled with an inert gas such as nitrogen and, when the fuel gas is supplied through the switching valve 7 to the fuel electrode 3 for the start of power generation, the inert gas having filled up the fuel electrode 3 is excluded and reaches the burner 8. When the inert gas reaches the burner 8, the state of combustion becomes unstable and, in the worst case, the flame is extinguished. Nevertheless, if the fuel gas rich in hydrogen is still supplied to the burner 8 continuously and the burner 8 is filled with the highly combustible gas, re-ignition and explosion can possibly occur. However, if the fuel gas is supplied to the fuel cell 1 and ignition operation of the burner 8 is performed for starting power generation in the fuel cell 1, re-ignition occurs rapidly when the combustion fuel gas supplied to the burner 8 reaches a ignitable composition and, as a result, an event of explosion does not occur even when the flame is extinguished.

Further, it is effective that the second control section prevents flame detection during the ignition operation of the burner, for a predetermined time duration after the fuel gas is supplied to the fuel cell, and until the flame detection current reaches a predetermined value or higher after the fuel gas is supplied to the fuel cell.

In general, when the flame is extinguished in the burner 8, in order to avoid the re-ignition and explosion after the burner 8 is filled with the highly combustible gas, the fuel cell power generator needs to be stopped urgently. However, when the fuel gas is supplied to the fuel cell 1 in order to start power generation, even in case that the flame of the burner 8 is extinguished temporarily, re-ignition can occur safely and rapidly as long as ignition operation of the burner 8 is performed. Accordingly, by ignoring temporary misfire and restarting the flame detection after the flame has become stable again, reliable start of power generation can be conducted without degrading the safety of the fuel cell power generator.

The above-mentioned embodiments have been described for the case that the fuel gas generator 6 is composed of a single reaction chamber, that is a reformer, but the fuel gas generator 6 may comprise a shifter for performing the shift reaction of CO and a purifier for performing the oxidization reaction of CO.

INDUSTRIAL APPLICABILITY

As described above, in the prior art, corresponding to the conversion rate from hydrocarbon in the raw material for power generation X into hydrogen in the steam reforming reaction in the fuel gas generator, the amount of hydrocarbon contained in the combustion fuel varies, whereby the ion current of the burner increases or decreases. In contrast, in accordance with the present invention, depending on the amount of hydrocarbon contained in the combustion fuel by switching the gain for the flame detection current of the flame detector into a predetermined value and performing the flame detection, an ion current permitting the flame detection can be obtained to ensure the difference between the ignition level and the misfire (fire extinction) level to be sufficiently large. Further, noise margin is also ensured to be appropriately large, and misidentification and misdetermination can be avoided to achieve reliable determination of ignition and misfire.

Further, the flame detection is performed by switching the gain for the flame detection current of the flame detector into a predetermined value depending on the temperature of the fuel gas generator, the amount of air supplied from the air blowing section to the burner, the amount of water supplied from the water feeder to the fuel gas generator, the concentration of hydrocarbon contained in the fuel gas G, or the supply amount of the raw material for power generation provided to the fuel gas generator, whereby the difference between the ignition level and the misfire (fire extinction) level is ensured to be sufficiently large and noise margin is also ensured to be appropriately large to avoid misidentification and misdetermination.

The invention claimed is:

1. A fuel cell power generator, comprising:
    a fuel gas generator for generating a fuel gas composed mainly of hydrogen from a raw material for power generation and water,
    a burner for heating said fuel gas generator,
    a first gas supply passage for supplying the fuel gas generated in said fuel gas generator to said burner,
    a fuel cell for performing power generation using said fuel gas and oxidant gas,
    a second gas supply passage for supplying off-gas discharged from a fuel electrode of said fuel cell to said burner, and
    a control section, wherein said control section supplies said fuel gas to said fuel cell and performs ignition operation of said burner when power generation is started in said fuel cell, after said burner combusts with a fuel gas discharged from said fuel gas generator via said first gas supply passage in starting up.

2. The fuel cell power generator in accordance with claim 1, further comprising a flame detector for detecting the state of a flame formed in said burner, wherein said control section prevents said flame detector from detecting said flame during the ignition operation of said burner.

3. The fuel cell power generator in accordance with claim 1, further comprising a flame detector for detecting the state of a flame formed in said burner, wherein said control section prevents said flame detector from detecting said flame for a predetermined time duration after said fuel gas is supplied to said fuel cell.

* * * * *